(12) United States Patent
Nystrom

(10) Patent No.: US 11,125,969 B2
(45) Date of Patent: Sep. 21, 2021

(54) BONDING OF RESONANT OSCILLATING MIRROR TO FRAME

(71) Applicant: Microsoft Technology Licensing, LLC, Redmond, WA (US)

(72) Inventor: Michael James Nystrom, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 16/396,290

(22) Filed: Apr. 26, 2019

(65) Prior Publication Data

US 2020/0341236 A1     Oct. 29, 2020

(51) Int. Cl.
*G02B 26/12*     (2006.01)
*G02B 7/182*     (2021.01)
*H04N 1/113*     (2006.01)

(52) U.S. Cl.
CPC .......... *G02B 7/1821* (2013.01); *G02B 26/12* (2013.01); *H04N 1/113* (2013.01)

(58) Field of Classification Search
USPC ................................. 359/224.1, 904
See application file for complete search history.

(56) References Cited

U.S. PATENT DOCUMENTS

| | | | |
|---|---|---|---|
| 5,550,669 A * | 8/1996 | Patel | G01C 11/02 248/485 |
| 6,173,895 B1 * | 1/2001 | Plesko | G06K 7/10653 235/462.33 |
| 6,445,514 B1 | 9/2002 | Ohnstein et al. | |
| 6,953,985 B2 | 10/2005 | Lin et al. | |
| 7,425,749 B2 | 9/2008 | Hartzell et al. | |
| 7,468,799 B2 | 12/2008 | de Groot et al. | |
| 9,242,856 B2 | 1/2016 | Chen et al. | |
| 2007/0170475 A1 * | 7/2007 | Matsuo | H01L 27/14618 257/291 |
| 2009/0243006 A1 * | 10/2009 | Takahashi | B81B 3/0078 257/415 |
| 2012/0174808 A1 | 7/2012 | Currano et al. | |

(Continued)

FOREIGN PATENT DOCUMENTS

EP     2878940 A1     6/2015

OTHER PUBLICATIONS

Singh, et al., "A Novel electrostatic Microactuator for Large Deflections in MEMS Applications", In Journal of Thin Solid Films, vol. 504, Issues 1-2, May 10, 2006, pp. 64-68.

*Primary Examiner* — Jennifer D. Carruth
(74) *Attorney, Agent, or Firm* — Alleman Hall Creasman & Tuttle LLP

(57) ABSTRACT

Examples are disclosed that relate to a resonant scanning mirror system comprising a mirror structure mounted to a frame via an adhesive. One example provides a resonant scanning mirror system comprising a frame defining a perimeter around a space, the frame including a mirror mounting portion having an opening. The mirror system also comprises a mirror structure spanning the space, the mirror structure having an oscillating mirror portion and a foot, the foot being attached to the mirror mounting portion with an adhesive and being positioned such that a location of the opening in the mirror mounting portion at least partially defines a location of an edge of a fillet of the adhesive where the adhesive meets the foot of the mirror structure.

20 Claims, 4 Drawing Sheets

(56) References Cited

U.S. PATENT DOCUMENTS

2014/0002964 A1* 1/2014 Li .................. B81B 7/0058
                                                361/679.01
2019/0369386 A1* 12/2019 Pu .................. G02B 26/0875

* cited by examiner

BONDING OF RESONANT OSCILLATING MIRROR TO FRAME

BACKGROUND

A display device may scan light from a light source to produce a viewable image. Various scanning mechanisms may be used, including but not limited to resonant scanning mirror systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to a resonant scanning mirror system comprising a mirror structure mounted to a frame via an adhesive. One example provides a resonant scanning mirror system comprising a frame defining a perimeter around a space, the frame including a mirror mounting portion having an opening. The mirror system also comprises a mirror structure spanning the space, the mirror structure having an oscillating mirror portion and a foot, the foot being attached to the mirror mounting portion with an adhesive and being positioned such that a location of the opening in the mirror mounting portion at least partially defines a location of an edge of a fillet of the adhesive where the adhesive meets the foot of the mirror structure.

DETAILED DESCRIPTION

Figure 1:
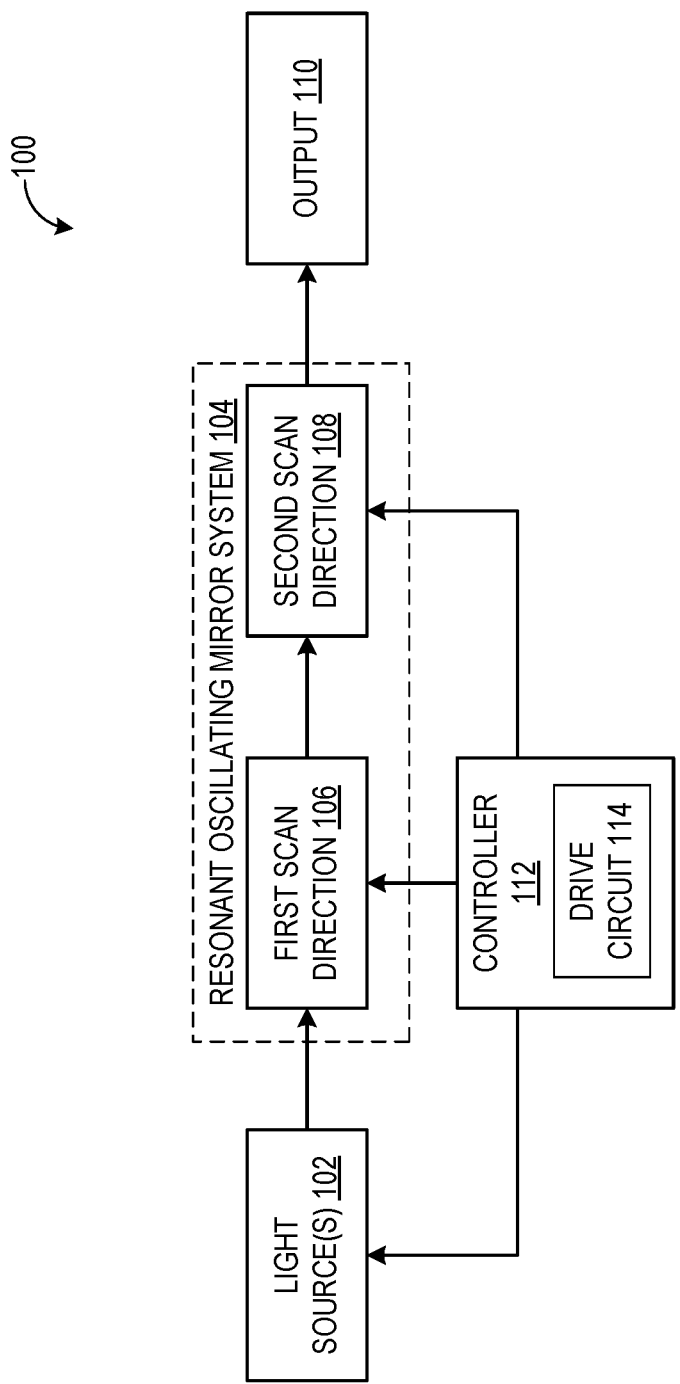
FIG. 1 schematically shows an example scanning display system.

A resonant scanning display system may utilize a micro-electro-mechanical system (MEMS) mirror system to scan light from a light source to form an image for display. FIG. 1 shows a block diagram of an example display device 100 comprising one or more light sources 102, (e.g. lasers) that output light to a resonant scanning mirror system 104. The resonant scanning mirror system 104 is configured to scan the light in a first scan direction 106 (e.g. horizontally) and in a second scan direction 108 (e.g. vertically). The resonant scanning mirror system 104 may include a single mirror driven in both horizontal and vertical directions, or two mirrors separately driven in horizontal and vertical directions. The resulting image is provided to an output 110 for display. The output 110 may assume any suitable form, such as a display surface, projection optics, waveguide optics, etc. As examples, the display device 100 may be configured as a virtual reality head-mounted display (HMD) device with the output 110 configured as an opaque surface, or as an augmented reality HMD device with the output configured as a see-through structure that allows virtual imagery to be combined with a view of the surrounding real-world environment. The display device 100 may assume other suitable forms, such as that of a head-up display, mobile device screen, monitor, television, etc.

The display device 100 further comprises a controller 112 configured to control operation of the light source(s) 102, resonant scanning mirror system 104 and other device components. The controller 112 comprises a drive circuit 114 configured to provide signals to the resonant scanning mirror system 104 to control scanning in each direction. Different scan rates may be used to scan in the first and second scan directions. For example, the display device 100 may scan in the first scan direction at a resonant frequency of the mirror, and in the second scan direction approximately at a frame rate of the video data.

Figure 2:
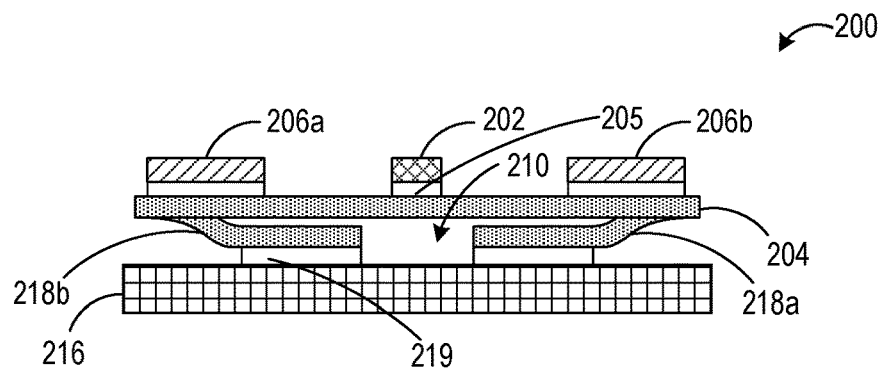
FIG. 2 shows a side view of an example resonant scanning mirror system.
Figure 3:
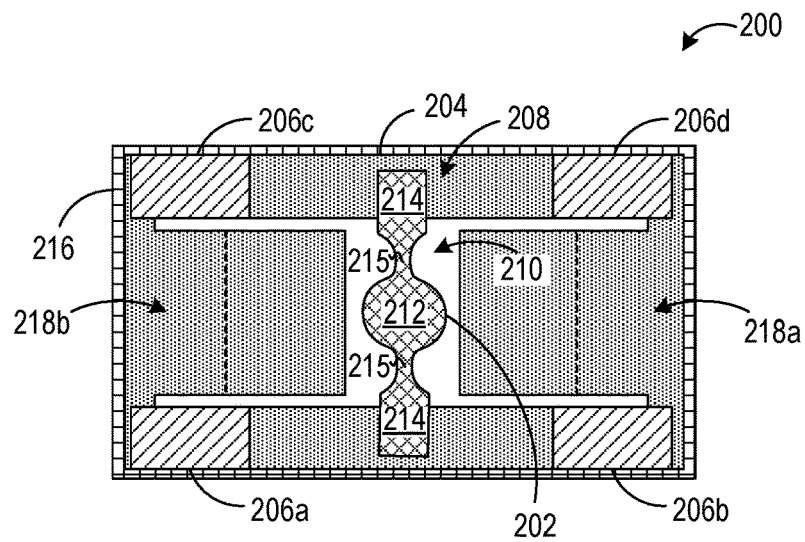
FIG. 3 shows a top view of the example scanning mirror system of FIG. 2.

FIGS. 2 and 3 schematically show a side view and top view, respectively, of an example resonant scanning mirror system 200 suitable for use as resonant scanning mirror system 104 of FIG. 1. The resonant scanning mirror system 200 comprises a mirror structure 202 attached to a frame 204 via an adhesive or mixture of adhesives (e.g. a polymer adhesive or solder) 205, as described in more detail below. The frame 204 defines a perimeter around a space 210. The mirror structure 202 spans the space 210 and includes an oscillating mirror portion 212, mirror feet 214 at which the mirror structure 202 is attached to the frame 204, and flexures that extend from the mirror feet 214 to the oscillating mirror portion 212.

The mirror structure 202 may be formed from any suitable material. In some examples, the mirror structure 202 is fabricated from silicon. The mirror structure 202 further may have any suitable dimensions. In one example, the mirror structure 202 may be approximately 15 millimeters in length from the end of one mirror foot to the other, and each mirror foot 214 may comprise a width of 3 millimeters.

The resonant scanning mirror system 200 further comprises a plurality of piezoelectric actuators 206a-d positioned on the frame 204 to drive a resonant oscillating mirror of the mirror structure 202. In other examples, other types of actuators (e.g. electrostatic, electromagnetic) may be used. The frame 204 may comprise electrical connections (not shown) to actuators 206a-d. The frame 204 may be formed from any suitable material, such as titanium, stainless steel, or a metal alloy, with a suitably similar coefficient of thermal expansion compared to the material from which the mirror structure 202 is formed. The frame 204 is mounted to a substrate 216 (e.g. a printed circuit board) via mounts 218a and 218b, which may both electrically and mechanically connect the substrate 216 to the frame 204 via an adhesive 219.

Figure 4:
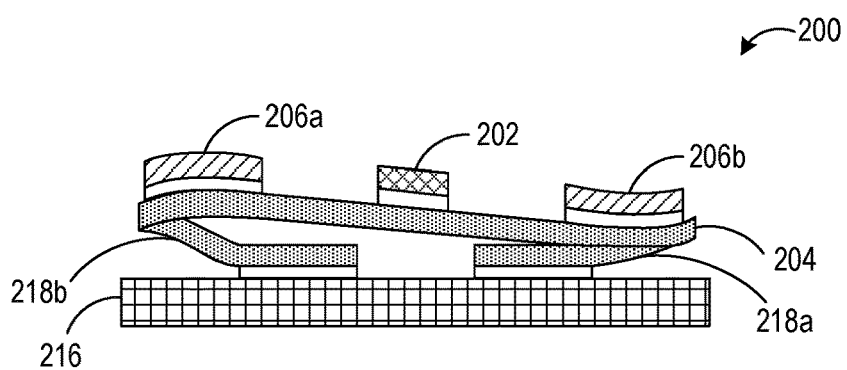
FIG. 4 shows a side view of the scanning mirror system of FIG. 2 during scanning.

FIG. 4 shows an example state of the resonant scanning mirror system 200 when suitable voltages are applied across each of the piezoelectric elements 206a-d. Because the piezoelectric elements 206a-d are constrained by the frame 204, the lattice changes experienced by the piezoelectric elements 206a-d due to the applied electric fields cause the frame 204 to deform, thereby tilting the oscillating mirror portion 212 (exaggerated in FIG. 4 for clarity). By modulating the voltages applied to each piezoelectrical element in a suitable phase relationship and at a suitable frequency, resonant oscillation of the oscillating mirror portion 212 may be achieved.

The adhesive joint between the mirror and the frame may experience repeated stress during mirror oscillation due to the energy transferred from the actuators to the mirror and the relatively high angles at which the mirror tilts during use. This may cause the adhesive joint between the mirror and the frame to fail over time, thereby impacting the lifetime of the display device. One possible solution is to use a greater amount of adhesive. However, the use of too much adhesive may result in variances between the location of the bond fillet when manufacturing devices. As a result, in some instances, the bond fillet may extend onto the flexure, which may impact the resonant frequency of the mirror system. Careful control of the volume and placement of adhesive may help to mitigate this issue. However, a suitably high degree of control of the adhesive placement may be difficult to achieve in a volume production environment.

Thus, to help control the location at which the bond fillet is positioned on the foot of a mirror structure, a mirror mounting portion of the frame may comprise an opening between a location at which the foot is adhered to the frame and an inner edge of the frame. The location of the opening may constrain the flow of adhesive along the frame during mounting of the foot, and thereby help to control the flow of adhesive along the foot toward the flexure via the surface tension of the adhesive. In this manner, the opening at least partially defines the location of the bond fillet on the foot of the mirror structure. Further, a shape of the edge of the opening may be configured to control a shape of the edge of the adhesive joint where the adhesive meets the foot of the mirror structure, as explained in more detail below. With the use of the opening in the frame, more relaxed tolerances may be used with regard to the adhesive volume and/or placement during device manufacturing than where the opening is omitted. This also may allow the use of less complex/expensive equipment to apply the adhesive, and may facilitate higher volume commercial production of a resonant scanning mirror system.

Figure 5:
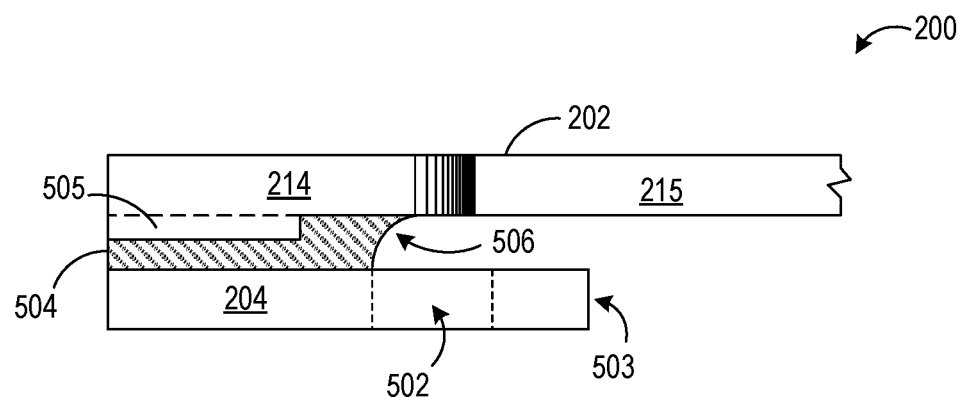
FIG. 5 shows a side sectional view of an example adhesive bond attaching the mirror structure to the frame of FIG. 2, and illustrates an opening in the frame configured to position and shape the adhesive bond at the junction of the adhesive with the mirror structure.
Figure 6:
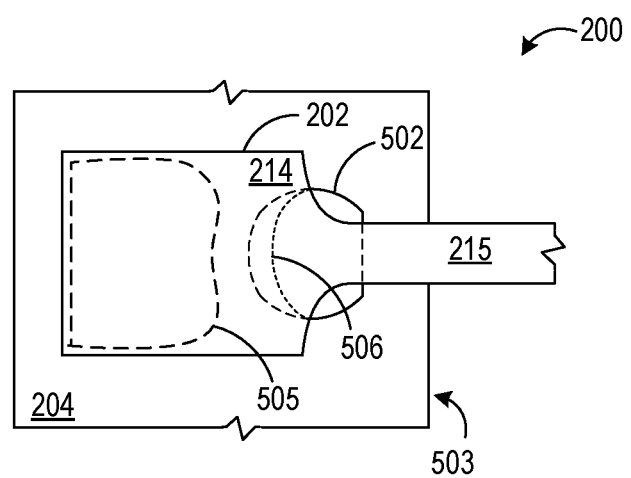
FIG. 6 shows a schematic top view of the adhesive bond of FIG. 5.

FIG. 5 shows a side view of an example opening 502 in the frame 204 of the resonant scanning mirror system 200 between a location at which the foot 214 is adhered to the frame 204 and an inner edge 503 of the frame. The foot 214 includes both the wider portion of the mirror structure 202 adhered to the frame, as well as the portion that tapers in width toward the flexure. The flexure 215 comprises the portion of the mirror structure 202 having parallel sides that extends from the foot 214 toward an oscillating mirror portion of the mirror structure 202.

The foot 214 includes a spacer 505 that spaces the flexure 215 from the frame 204. As shown, the adhesive 504 is placed between the spacer 505 and the frame 204. During manufacturing, the adhesive 504 is deposited onto the foot and/or the frame, and the foot and frame are pressed together. The pressure forces some adhesive out from between the spacer 505 and the foot 214, which may flow along the frame and the foot toward the flexure. As such, the location of the opening 502 is configured to constrain the flow of the adhesive 504 along the frame, thereby at least partially defining the location of the bond fillet (via the surface tension of the adhesive) and helping to prevent the adhesive from reaching the flexure. The location of the fillet is thus less dependent upon the volume of adhesive used when the frame comprises the opening 502 than when the frame omits the opening.

Any suitable material may be used as the adhesive 504. Suitable materials to use as the adhesive 504 include those that wet the mirror structure and the frame, and that have sufficient surface tension for the opening 502 to effectively control the flow of adhesive along the surface of the foot. As one example, where the mirror structure 202 is formed from silicon, the adhesive 504 may comprise an epoxy material. As another example, the adhesive may comprise a solder.

In the depicted example, the spacer 505 has a curved shape at an edge adjacent to the opening 502, and the edge of the opening 502 adjacent to the spacer 505 has a similar curvature. The curvature of the spacer 505 may help to spread stress of the adhesive joint at a location where the adhesive meets the spacer 505 over a longer linear distance, rather than the stress being focused at any one location. The curved edge of the opening 502 may help define a curvature of an edge 506 of the adhesive 504 where the fillet of the adhesive joint meets the mirror structure 202. This may strengthen the joint against stresses caused by mirror oscillation. In various examples, the opening 502 may be D-shaped, circular, elliptical, rectangular shaped, or have any other suitable shape. In one example, a D-shaped opening may be 1.5 millimeters in width (from the middle of the curve of the D to the middle of the straight edge of the D) and 2 millimeters in length.

The opening 502 may provide additional benefits during manufacturing. For example, the opening 502 may allow visual inspection of the adhesive 504, including the edge 506, after formation of the adhesive bond to confirm that adhesive is present and properly positioned/configured.

Figure 7:
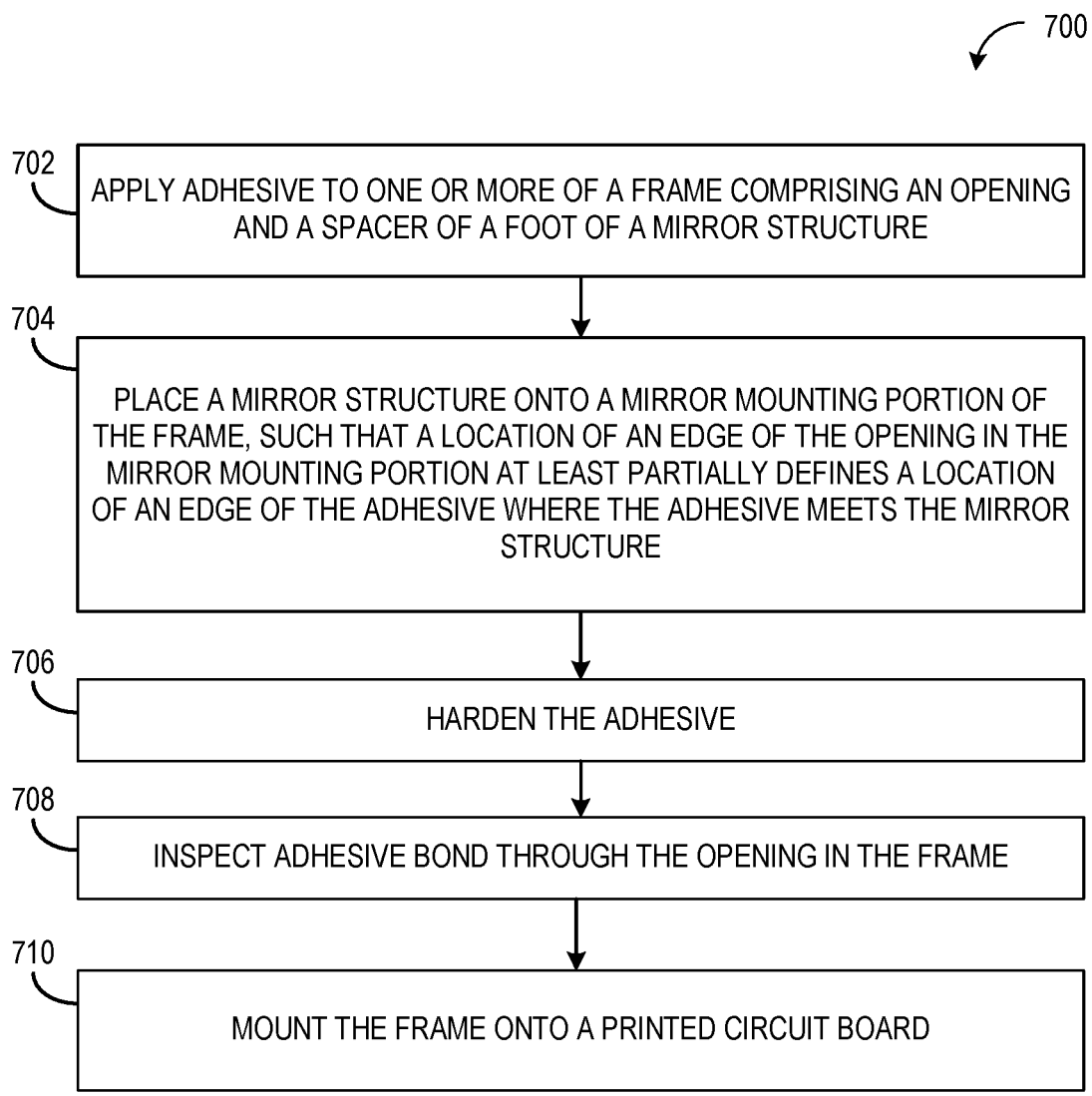
FIG. 7 shows an example method of assembling a scanning mirror system.

FIG. 7 shows an example method 700 of assembling a resonant scanning mirror system. The method 700 includes, at 702, applying an adhesive to a frame adjacent to an opening in the frame and/or to a foot of a mirror structure. The method 700 further includes, at 704, placing the mirror structure onto a mirror mounting portion of the frame and pressing the parts together. As a result, adhesive may flow from between the spacer and the frame to the edge of the opening in the frame; however, the opening constrains further travel of the adhesive along the frame, thereby helping to define a location of a bond fillet of the adhesive bond being formed. For example, the surface tension of the adhesive may help to prevent the adhesive from flowing along the foot to the flexure, even where the adhesive strongly wets the surface of the foot. In some examples, the edge of the opening in the frame may comprise a shape, such as a curvature, that at least partially defines a shape of an edge of the adhesive where the adhesive meets the mirror structure.

The method 700 further includes, at 706, hardening the adhesive (e.g. by thermal curing, photo curing, solvent evaporation, and/or any other suitable method). After curing the adhesive, the method 700 may comprise, at 708 inspecting the adhesive bond through the opening in the frame, such as in a quality control step. As described above, such inspection may help to confirm that the adhesive is positioned as desired. The method 700 further may comprise, at 708, mounting the frame onto a printed circuit board.

Another example provides a resonant scanning mirror system comprising a frame defining a perimeter around a space, the frame including a mirror mounting portion comprising an opening, and a mirror structure spanning the space, the mirror structure having an oscillating mirror portion and a foot, the foot being attached to the mirror mounting portion with an adhesive and being positioned such that a location of the opening in the mirror mounting portion at least partially defines a location of an edge of a fillet of the adhesive where the adhesive meets the foot of the mirror structure. In such an example, the foot may additionally or alternatively comprise a spacer, and an edge of the spacer may additionally or alternatively comprise a curve. In such an example, an edge of the opening adjacent to the edge of the spacer may additionally or alternatively comprise a curve. In such an example, the mirror structure may additionally or alternatively comprise a flexure connecting the resonant oscillating mirror portion to the foot of the mirror structure, and the edge of the fillet of the adhesive may additionally or alternatively be located fully within the foot. In such an example, the resonant scanning mirror system may additionally or alternatively comprise one or more piezoelectric actuators positioned on the frame. In such an example, the resonant scanning mirror system may additionally or alternatively comprise a substrate, wherein the frame may additionally or alternatively be mounted to the substrate. In such an example, the substrate may additionally or alternatively comprise a printed circuit board. In such an example, the adhesive may additionally or alternatively comprise a solder. In such an example, the adhesive may additionally or alternatively comprise a polymer adhesive.

Another example provides a display device comprising a resonant scanning mirror system comprising a frame defining a perimeter around a space, the frame including a mirror mounting portion comprising an opening, and a mirror structure spanning the space, the mirror structure having an oscillating mirror portion and a foot, the foot being attached to the mirror mounting portion with an adhesive and being positioned such that a location of the opening in the mirror mounting portion at least partially defines a location of an edge of a fillet of the adhesive where the adhesive meets the foot of the mirror structure. In such an example, the display device may additionally or alternatively comprise a spacer, an edge of the spacer may additionally or alternatively comprise a curve, and an edge of the opening adjacent to the edge of the spacer may additionally or alternatively comprise a curve. In such an example, the opening may additionally or alternatively be D-shaped or elliptical. In such an example, the mirror structure may additionally or alternatively comprise a flexure connecting the resonant oscillating mirror portion to the foot of the mirror structure, and the edge of the fillet of the adhesive may additionally or alternatively be located fully within the foot. In such an example, a location of the opening may additionally or alternatively at least partially define a location of the edge of the adhesive where the adhesive meets the foot of the mirror structure. In such an example, the resonant scanning mirror system may additionally or alternatively comprise a printed circuit board, and the frame may additionally or alternatively be mounted to the printed circuit board. In such an example, the adhesive may additionally or alternatively comprise a polymer adhesive. In such an example, the adhesive may additionally or alternatively comprise a solder.

Another example provides a method of assembling a resonant scanning mirror system, the method comprising applying an adhesive to one or more of a frame adjacent to an opening in the frame and a spacer of a foot of a mirror structure, placing the mirror structure onto a mirror mounting portion of the frame, such that a location of an edge of the opening in the mirror mounting portion at least partially defines a location of an edge of a fillet of the adhesive where the adhesive meets the mirror structure, and hardening the adhesive. In such an example, the method may additionally or alternatively comprise mounting the frame onto a printed circuit board. In such an example, the method may additionally or alternatively comprise inspecting an adhesive bond through the opening in the frame.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A resonant scanning mirror system comprising:
 a frame and a mirror structure adhered to the frame via an adhesive,
  the frame defining a perimeter around a space, the space being configured to accommodate oscillating motion of the mirror structure, the frame including a mirror mounting portion comprising an opening, and
  the mirror structure spanning the space, the mirror structure having an oscillating mirror portion positioned over the space in the frame, a flexure, and a foot adhered to the mirror mounting portion of the frame,
  the flexure extending between the foot and the oscillating mirror portion,
  the foot being adhered to the mirror mounting portion with the adhesive, and
  the foot being positioned such that an edge of a fillet of the adhesive where the adhesive meets the foot of the mirror structure follows at least a portion of an edge of the opening.

2. The resonant scanning mirror system of claim 1, wherein the foot further comprises a spacer, wherein an edge of the spacer comprises a curve.

3. The resonant scanning mirror system of claim 2, wherein an edge of the opening adjacent to the edge of the spacer comprises a curve.

4. The resonant scanning mirror system of claim 1, wherein the edge of the fillet of the adhesive is located fully within the foot.

5. The resonant scanning mirror system of claim 1, further comprising one or more piezoelectric actuators positioned on the frame.

6. The resonant scanning mirror system of claim 1, further comprising a substrate, wherein the frame is mounted to the substrate.

7. The resonant scanning mirror system of claim 6, wherein the substrate comprises a printed circuit board.

8. The resonant scanning mirror system of claim 1, wherein the adhesive comprises a solder.

9. The resonant scanning mirror system of claim 1, wherein the adhesive comprises a polymer adhesive.

10. A display device, comprising:
 a resonant scanning mirror system comprising
  a frame and a mirror structure adhered to the frame via an adhesive, the frame defining a perimeter around a space, the frame including a mirror mounting portion comprising an opening, and the mirror structure spanning the space, the mirror structure having an oscillating mirror portion positioned over the space in the frame, a flexure, and a foot adhered to the mirror mounting portion of the frame, the flexure extending between the foot and the oscillating mirror portion, the foot being adhered to the mirror mounting portion with the adhesive, and the foot being positioned such that an edge of a fillet of the adhesive where the adhesive meets the foot of the mirror structure follows at least a portion of an edge of the opening.

11. The display device of claim 10, further comprising a spacer, wherein an edge of the spacer comprises a curve, and wherein an edge of the opening adjacent to the edge of the spacer also comprises a curve.

12. The display device of claim 10, wherein the opening is D-shaped or elliptical.

13. The display device of claim 10, wherein the edge of the fillet of the adhesive is located fully within the foot.

14. The display device of claim 10, wherein a location of the opening at least partially defines a location of the edge of the adhesive where the adhesive meets the foot of the mirror structure.

15. The display device of claim 10, wherein the resonant scanning mirror system further comprises a printed circuit board, and wherein the frame is mounted to the printed circuit board.

16. The display device of claim 10, wherein the adhesive comprises a polymer adhesive.

17. The display device of claim 10, wherein the adhesive comprises a solder.

18. A method of assembling a resonant scanning mirror system, the method comprising:

applying an adhesive to one or more of a frame adjacent to an opening in the frame and a spacer of a foot of a mirror structure;

placing the mirror structure onto a mirror mounting portion of the frame, such that an edge of a fillet of the adhesive where the adhesive meets the mirror structure follows at least a portion of an edge of the opening in the frame; and hardening the adhesive.

19. The method of claim 18, further comprising mounting the frame onto a printed circuit board.

20. The method of claim 18, further comprising inspecting an adhesive bond through the opening in the frame.

* * * * *